Nov. 4, 1930.                H. M. JACOBS                 1,780,649
                            WARMING DEVICE
                         Filed May 14, 1929           2 Sheets-Sheet 1

INVENTOR.
Harry M Jacobs
BY
ATTORNEYS.

Nov. 4, 1930. H. M. JACOBS 1,780,649
WARMING DEVICE
Filed May 14, 1929 2 Sheets-Sheet 2

Patented Nov. 4, 1930

1,780,649

UNITED STATES PATENT OFFICE

HARRY M. JACOBS, OF BROOKLYN, NEW YORK, ASSIGNOR TO THE JACOBS BROS. CO. INC., OF BROOKLYN, NEW YORK, A CORPORATION OF NEW YORK

WARMING DEVICE

Application filed May 14, 1929. Serial No. 363,057.

This invention relates to a food warmer or heater and while the same may be utilized in numerous different associations, it is primarily intended for employment for the display and heating in an improved manner of such products as, for example, peanuts, coffee, chestnuts, etc.

It is an object of the invention to provide a device of this character, the parts of which will be relatively few in number and individually simple and rugged in construction, these parts forming an operative device capable of being manufactured and sold at a nominal figure and which may be used over a long period of time with freedom from difficulties.

A further object of the invention is that of providing a heater which will effectually and attractively display products which are to be dispensed and which will maintain such products in perfect condition through out long periods of time aside from the fact that these products will always be readily accessible.

A further object is that of constructing a device of this type which may be operated at minimum expense and in which it will not be necessary to disturb the neat appearance of the displayed goods.

With these and other objects in mind, reference is had to the attached sheets of drawings illustrating one practical embodiment of the invention, and in which.

Figure 1:
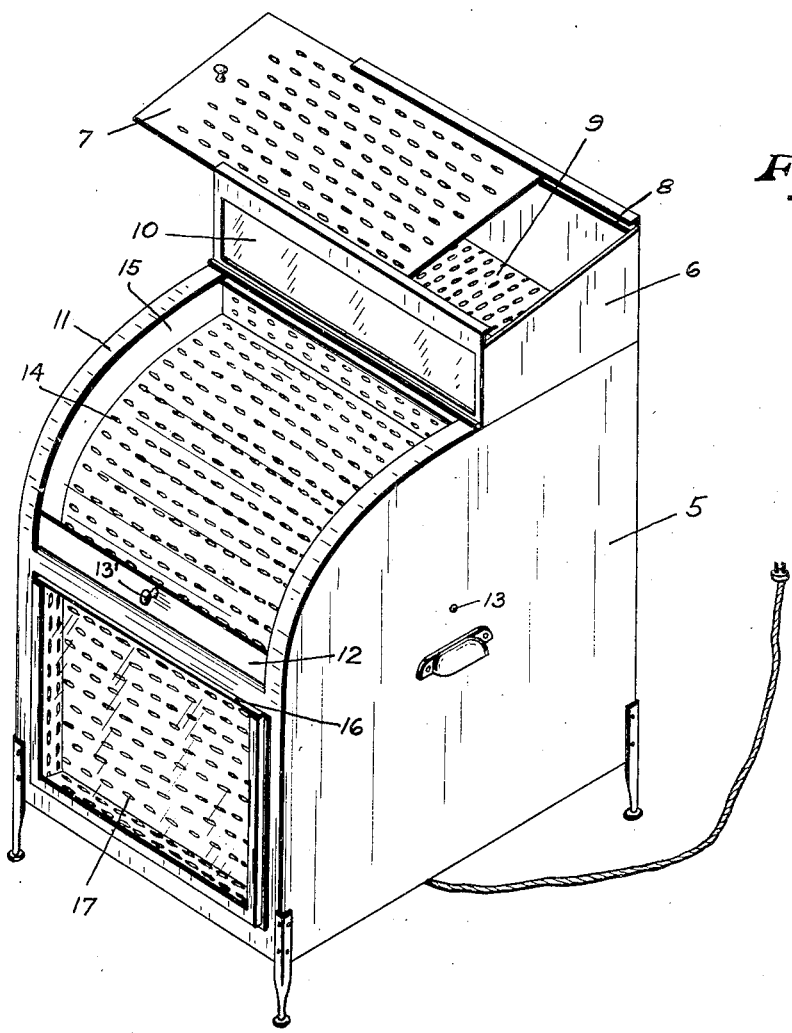
Fig. 1 is a perspective view of a heater.

In these views, the reference numeral 5 indicates a casing of any desirable configuration and formed for example of metal. Upon this casing and forming a part thereof is a container 6 with which a closure 7 is associated. This association in the illustrated embodiment is achieved by having grooves 8 formed adjacent the longitudinal edges of the container and within which grooves the cover may ride. It is obvious, however, that any other desirable form of connection might be provided at this point. The cover of this receptacle as well as its base 9 is preferably perforated. This has an advantage of permitting heat to pass through the latter so that the products contained therein may be maintained in heated condition. By having the cover 7 perforated, the aroma of such products may escape which in the instance of such products as for example coffee and chestnuts usually has the effect of inducing a purchase thereof. It will, moreover, be observed that the front face of the container 6 may be in the nature of a glass or otherwise transparent panel 10 through which the goods therein are displayed.

The upper portion of the casing 5 is preferably bowed as has been indicated at 11 and a cover 12 is hingedly mounted as at 13 and disposed adjacent this bowed portion so that the entire interior of the receptacle may be exposed or the receptacle may be closed simply by shifting the cover through the medium of, for example, the handle 13′. The cover also mounts a tray 14 which may be perforated and a glass panel 15 is mounted by the cover at a point overlying the tray. Thus a space is provided between this panel and the tray which may receive products which will be retained in effectively displayed condition. It will, of course, be understood that in the interests of economy, it is not necessary to utilize glass but in lieu thereof, any suitable transparent or translucent substance might be employed.

Figure 2:
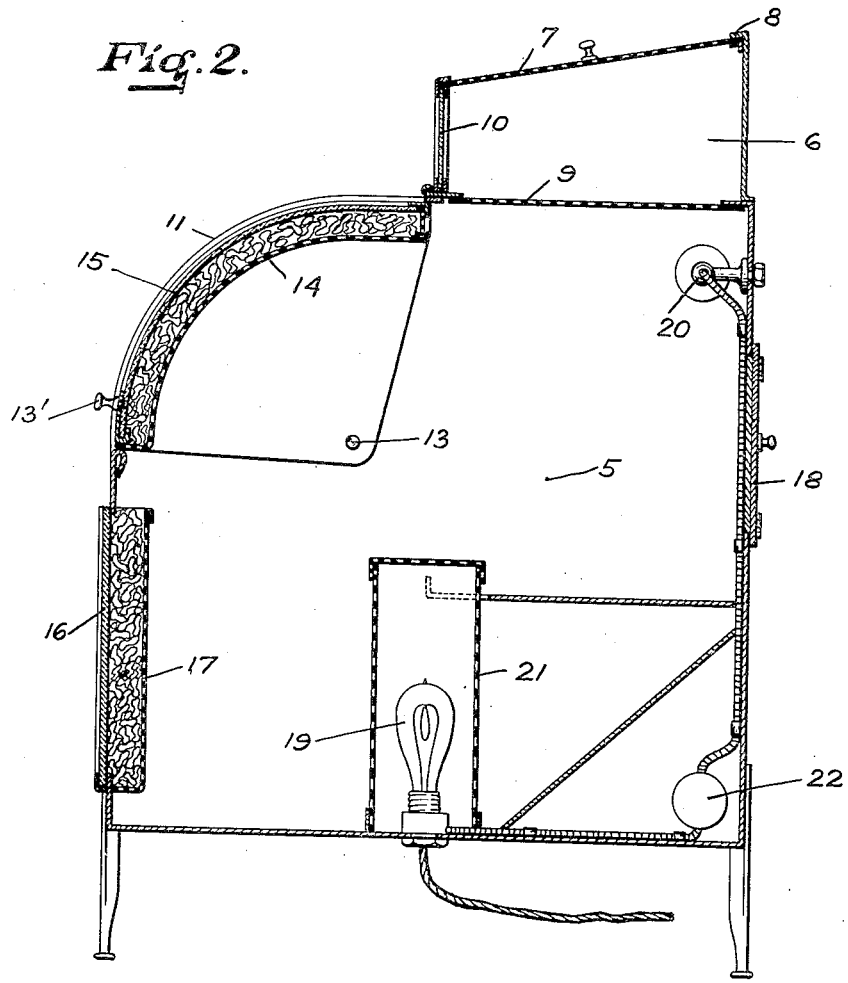
Fig. 2 is a sectional side view thereof.

The front of the cabinet 5 is also preferably provided with a glass panel 16, to the rear of which a tray 17 corresponding to the tray 14 is positioned and filled with products for display purposes, it being noted that in this instance, the panel is preferably removable so that the tray may be cleaned, refilled, etc., and with final reference to the cabinet, it will be noted as in Fig. 2 that the rear wall of the same may be provided with an opening normally closed by a door 18 which opening is conveniently utilized when only the rear of the heater is accessible.

Now, with a view to providing a heat maintaining structure, it will be observed that a pair of incandescent bulbs 19 and 20 might be employed. The first of these preferably extends centrally of the casing and is enclosed in a perforated element 21 which serves to protect it against injury. The second bulb 20 underlies the container 6 and its action is controlled by a switch 22. It is apparent that if the interior of the receptacle is partially or wholly filled with products that the latter will be maintained in heating condition by the bulb 19. Moreover, if this bulb has in circuit an automatically acting "flash" device, the constantly recurring interruption to the source of illumination will be apparent through the interstices of the products and the perforations of the trays 14 and 17 thus attracting attention to the display. The heater 20 serves to maintain the products within the casing 9 in a highly heated condition and ready for dispensing and also assures that the aroma of such products will pass out through the cover 7 it being obvious that an operator will ordinarily seek to maintain this container in substantially filled condition and replenish any depletion of products therefrom from within the body of a receptacle 5.

From the foregoing, it will be understood that among others, the several objects of the invention are achieved. It will additionally be plain that numerous changes in construction and rearrangements of the parts might be resorted to without departing from the spirit of the invention as defined by the claim.

Having described my invention, what I claim as new and desire to secure by Letters Patent, is:

A warming device including a casing, a source of illumination and heat disposed within said casing, a perforated shield embracing said source to permit warm air to pass through the shield, a container associated with said casing and embracing a perforated base through which warmed air may pass from within said casing, and a perforated cover associated with said container and through the perforations of which said air may escape after flowing through the container.

In testimony whereof I affix my signature.

HARRY M. JACOBS.